UNITED STATES PATENT OFFICE.

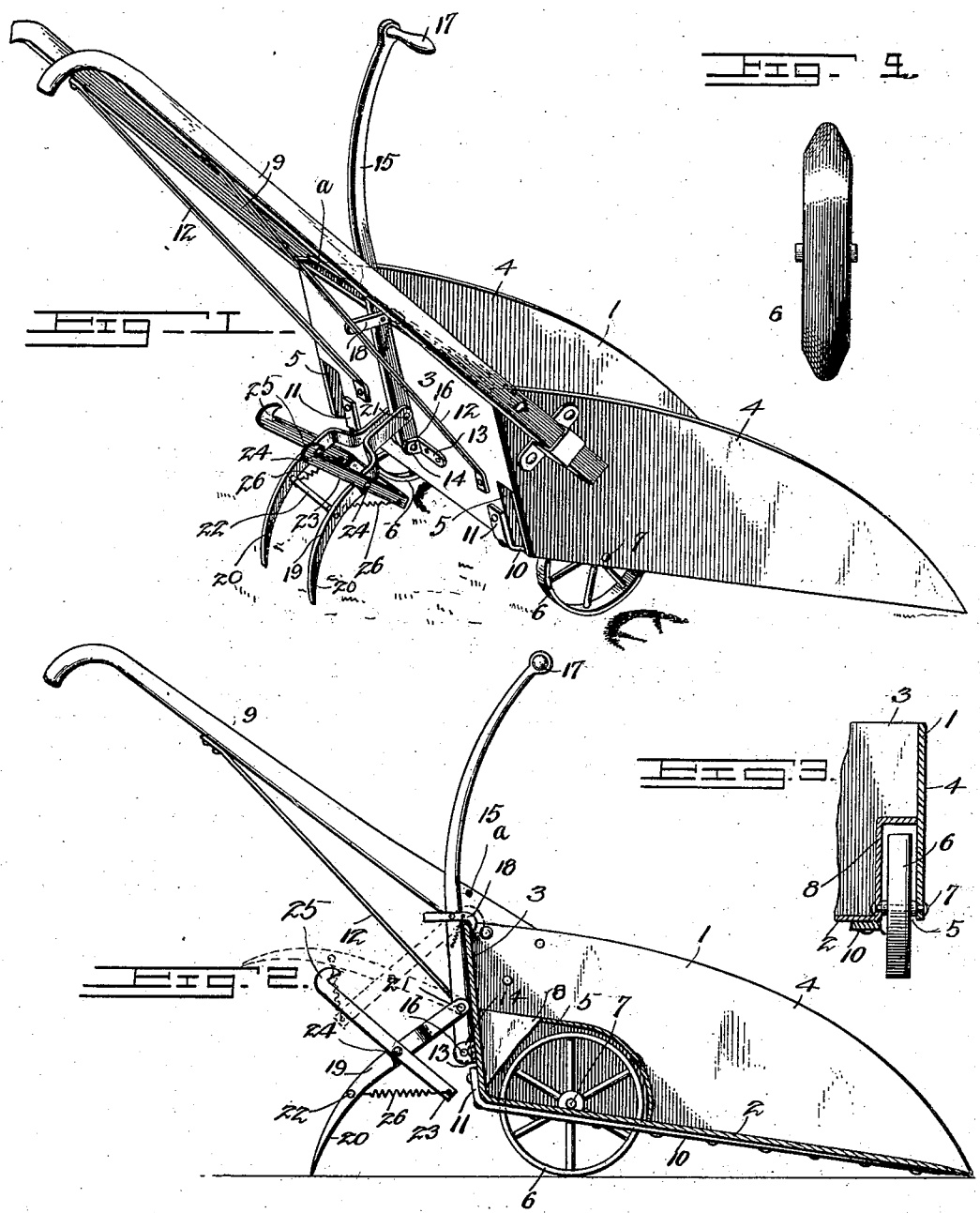

JOHN FELTON, OF FERTILE, MINNESOTA.

HAND DUMP-SHOVEL.

SPECIFICATION forming part of Letters Patent No. 694,263, dated February 25, 1902.

Application filed November 14, 1901. Serial No. 82,303. (No model.)

*To all whom it may concern:*

Be it known that I, JOHN FELTON, a citizen of the United States, residing at Fertile, in the county of Polk and State of Minnesota, have invented a new and useful Hand Dump-Shovel, of which the following is a specification.

My invention is an improved hand dump-shovel adapted for use in moving grain, coal, and other material; and it consists in the peculiar construction and combination of devices hereinafter fully set forth and claimed.

In the accompanying drawings, Figure 1 is a perspective view of a hand dump-shovel embodying my improvements, showing the same in one of its loading positions. Fig. 2 is a vertical longitudinal sectional view of the same, showing the engaging dog in engaged position with the floor or other surface on which the dump-shovel is operated. Fig. 3 is a detail transverse sectional view. Fig. 4 is a detail view of a modification.

In the embodiment of my invention here shown the shovel or body 1 is substantially in the form of a scoop and comprises the bottom 2, the rear wall 3, and the side walls 4. In practice the said body or shovel may be made of sheet iron or steel or any other suitable material. In the bottom of the shovel or body, at the sides thereof and at a suitable distance from the front thereof, are longitudinal openings 5. Supporting-wheels 6 have their upper portions disposed in the said openings, and the said wheels are mounted on axles 7, which have their bearings in the side walls of the shovel or body and in covers 8, which are disposed over the said openings and the said wheels. The latter enable the shovel or body to be readily trundled from place to place and serve to support the shovel or body and the load therein when the front end of the said shovel or body is raised.

To enable the shovel or body to be operated and moved from place to place, I provide a pair of handles 9. The front ends of the same are secured on the side walls of the shovel or body at the rear upper corners thereof, either as shown in Fig. 1 of the drawings or by any other suitable means. The bottom of the body or shovel is reinforced by a pair of longitudinally-disposed metallic straps 10, which are riveted or otherwise secured under the bottom of the body or shovel near the sides thereof and just within the openings 5, and the rear ends of which reinforcing-straps are upturned and riveted or otherwise secured to the rear wall of the body or shovel, as shown in Figs. 1 and 2 at 11.

On the rear side of the shovel or body are secured the front ends of a pair of brace-rods 12, the rear upper ends of which are secured to the under sides of the handles 9.

A pair of transversely-disposed bars 13 are secured on the rear side of the body or shovel at a suitable distance above the bottom thereof, and the inner proximate ends of the said bars 13 are turned rearwardly at right angles to form lugs 14, between which is disposed the lower end of a lever 15, which is pivotally bolted between the said lugs, as at 16. At the upper end of the said lever, which is curved forwardly, as shown, is a laterally-extending handle 17. A spring-pressed latch 18 is carried by the said lever, and the said latch is adapted to normally lock the said lever to the upper side of the rear wall of the body or shovel, as shown in Figs. 1 and 2 of the drawings.

A dog 19, which is here shown as provided with a pair of prongs 20, is pivotally connected at its upper end to the lever 15, near the lower end of the latter, by a bolt or other suitable device 21. The prongs of the said dog are connected together by a foot bar or rod 22. The said dog is adapted to be turned downwardly, so that its prongs may engage the floor or surface on which the hand dump-shovel is operated, or it may be turned upwardly to raise the prongs from their said engaging position. I provide a catch 23, which is pivoted, as at 24, to the said dog, and is here shown as of substantially the form of the letter U and provided with a pair of hooks 25. The said catch 23 is actuated by a spring or springs 26, and when the said dog is turned upwardly the said hooks of the said catch are adapted to engage the upper side of the rear wall 3, as indicated in dotted lines in Fig. 2. A rod $a$ connects the handles 9 together and is disposed at a point above the rear side of the shovel or body.

The operation of my invention is as follows: In order to load my improved hand dump-shovel, the same is pushed by the handles 9 and its front side lowered to the ground or floor before reaching the pile of grain or other material and the shovel or body pushed thereinto as far as possible, thus causing the body or shovel to be partially or entirely filled with the material. In the event that this action results in insufficiently loading the body or shovel the lever 15 must be operated to further urge the same into the material. To thus operate the lever 15, the operator first trips the hook 25 from the rear wall of the body or shovel by pressing with the toe of one foot on the lower portion of the U-shaped catch 23. This allows the dog 19 to drop to and engage with the floor at a point in rear of the shovel or body. The operator then also pushes the hook 18, which may be done with the toe of one foot, thereby disengaging the lever from the rear end of the shovel. He then places his foot on the brace or rod 22, presses downwardly on one of the handles with one hand, and with the other draws the lever 15 rearwardly, thereby causing the shovel or body to be forced into the pile of material, as will be understood. The lever 15 may be operated as many times as is necessary to thus load the shovel or body. Usually, however, it is not necessary to thus operate the lever 15, and the latter need not be disengaged from the rear side of the shovel or body. Assuming that the dog has been engaged with the floor in the manner previously described, the shovel or body may be urged into the pile of material by alternately raising and lowering the rear end thereof, which may be done by means of the handles 9. On each upward movement of the rear end of the shovel or body the points of the dog are drawn forward and reëngaged with the floor, the operator having one foot on the bar 22, and at each downward movement of the rear end of the body or shovel the leverage of the handles and dog is such as to urge the shovel or body forwardly into the pile. This operation may be repeated until the shovel or body is loaded. Having thus loaded the shovel or body, the handles are depressed until the hooks 25 engage the upper side of the rear wall of the shovel or body, and this action also shifts the center of gravity of the load rearwardly in the shovel or body and balances the same on the wheels 6, as will be understood, and the loaded shovel may be then readily wheeled to the dump.

My improved hand dump-shovel is especially adapted for use for unloading coal or grain from cars and in handling ore in mines. The peripheries of the wheels 6 are flat when the dump-shovel is used in handling coal or ore; but when the same is used in handling grain the peripheries of the wheels are preferably beveled and rounded at the angle formed by the bevels, as indicated in Fig. 4, the wheels when thus fashioned acting to push the grain laterally out of their way, thus avoiding the crushing of the grain.

I do not desire to limit myself to the precise construction and combination of devices herein shown and described, as it is evident that modifications may be made therein without departing from the spirit of my invention.

Having thus described my invention, I claim—

1. A hand dump-shovel having supporting-wheels on which the same is adapted to be balanced and provided with rearwardly-extending handles, in combination with a lever connected to said shovel and a device carried by said lever to engage the floor or surface on which the shovel is operated, and in coaction with said lever push the said shovel forwardly into a pile of material to load said shovel, substantially as described.

2. A shovel or body of the class described having supporting-wheels which adapt the same to be tilted or inclined and means whereby it may be pushed into a mass of material, tilted or inclined to any desired angle and moved on its wheels from point to point, in combination with a lever fulcrumed to said body and a dog pivoted to and thereby adapted to be operated by said lever, to engage the surface on which the shovel or body is operated and push the same forwardly into a pile of material, whereby the same may be loaded, substantially as described.

3. In combination with a hand dump-shovel having supporting-wheels and rearwardly-extending handles, a lever fulcrumed on the rear side of said shovel and having a catch to lock the same thereto, a dog for the purpose set forth, pivotally connected to the said lever and a catch to lock the said dog in an elevated disengaged position, substantially as described.

4. In combination with a hand dump-shovel having supporting-wheels and rearwardly-extending handles, a lever fulcrumed on the rear side of said shovel, and a dog pivotally connected to the said lever, said dog having an element adapted to be depressed by the foot of the operator to engage said dog with the floor or surface on which said hand dump-shovel is operated, substantially as described.

In testimony that I claim the foregoing as my own I have hereto affixed my signature in the presence of two witnesses.

JOHN FELTON.

Witnesses:
H. L. GAYLORD,
HARRY O. GAYLORD.